United States Patent
Byun et al.

(10) Patent No.: US 10,440,662 B2
(45) Date of Patent: *Oct. 8, 2019

(54) METHOD AND APPARATUS FOR CONTROLLING POWER IN WIRELESS COMMUNICATION SYSTEM

(71) Applicant: LG ELECTRONICS INC., Seoul (KR)

(72) Inventors: Ilmu Byun, Seoul (KR); Joonkui Ahn, Seoul (KR); Suckchel Yang, Seoul (KR); Heejeong Cho, Seoul (KR); Genebeck Hahn, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/748,811

(22) PCT Filed: Dec. 15, 2015

(86) PCT No.: PCT/KR2015/013770
§ 371 (c)(1),
(2) Date: Jan. 30, 2018

(87) PCT Pub. No.: WO2017/026594
PCT Pub. Date: Feb. 16, 2017

(65) Prior Publication Data
US 2018/0227861 A1   Aug. 9, 2018

Related U.S. Application Data

(60) Provisional application No. 62/204,457, filed on Aug. 13, 2015.

(51) Int. Cl.
*H04W 72/04* (2009.01)
*H04W 52/34* (2009.01)
*H04W 52/36* (2009.01)

(52) U.S. Cl.
CPC ....... *H04W 52/346* (2013.01); *H04W 72/042* (2013.01); *H04W 72/0413* (2013.01); *H04W 72/0473* (2013.01); *H04W 52/367* (2013.01)

(58) Field of Classification Search
CPC . H04W 52/34; H04W 52/346; H04W 52/367; H04W 72/0413; H04W 72/042; H04W 72/0473

(Continued)

(56) References Cited

U.S. PATENT DOCUMENTS

| | | |
|---|---|---|
| 2014/0071954 A1 | 3/2014 | Au et al. |
| 2014/0206410 A1 | 7/2014 | Kim et al. |
| 2015/0092670 A1* | 4/2015 | Makhlouf ........... H04W 52/265 370/329 |

FOREIGN PATENT DOCUMENTS

| | | |
|---|---|---|
| CN | 101292456 | 10/2008 |
| EP | 2557861 | 2/2013 |
| EP | 2696550 | 2/2014 |

OTHER PUBLICATIONS

3GPP TS 36.211 V8.2.0, Mar. 2008, section 4.2.

* cited by examiner

*Primary Examiner* — Philip Sobutka
(74) *Attorney, Agent, or Firm* — Dentos US LLP

(57) ABSTRACT

A method and a device for controlling power in a TDD-based wireless communication system are provided. Particularly, a first resource block group for a first terminal and a second resource block group for a second terminal are configured. The first resource block group is configured in a partial frequency band of the entire frequency band. The (Continued)

maximum transmission power of the first terminal is controlled for the first resource block group according to the ratio between the number of subcarriers in the first resource block group and the number of subcarriers in the second resource block group. An uplink signal of the first terminal and an uplink signal of the second terminal are received through the first resource block group.

12 Claims, 10 Drawing Sheets

(58) Field of Classification Search
USPC .......................................................... 455/522
See application file for complete search history.

METHOD AND APPARATUS FOR CONTROLLING POWER IN WIRELESS COMMUNICATION SYSTEM

CROSS-REFERENCE TO RELATED APPLICATIONS

This application is the National Stage filing under 35 U.S.C. 371 of International Application No. PCT/KR2015/013770, filed on Dec. 15, 2015, which claims the benefit of U.S. Provisional Application No. 62/204,457 filed on Aug. 13, 2015, the contents of which are all hereby incorporated by reference herein in their entirety.

BACKGROUND OF THE INVENTION

Field of the Invention

The present invention relates to wireless communication and, most particularly, to a method for controlling power in a wireless communication system and an apparatus using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

Technical Objects

This specification provides a method for controlling power in a wireless communication system and an apparatus using the same.

Technical Solutions

This specification proposes a method for controlling power in a wireless communication system by using a radio frame including a downlink subframe and an uplink subframe.

The terms used herein will first be defined. A first user equipment may refer to the user equipment adopting TTI, and a second user equipment may refer to the user equipment adopting sTTI. A first resource block group may correspond to a RBG, which is the minimum resource allocation unit of the user equipment adopting TTI, and a second resource block group may correspond to an sRGB, which is the minimum resource allocation unit of the user equipment adopting sTTI. More specifically, the first resource block group is transmitted in TTI units corresponding to a subframe, and the second resource block group is transmitted in sTTI units, which are configured to be shorter than TTI in time. Since the system corresponds to a TDD based wireless communication system, communication is performed by using a radio frame, which includes a downlink subframe and an uplink subframe that follows the downlink subframe.

A first resource block group for the first user equipment and a second resource block group for the second user equipment are configured. Herein, the first resource block group is configured in part of the frequency band among the entire frequency band.

The maximum transport power of the first user equipment for the first resource block group is controlled in accordance with a ratio between the number of subcarriers within the first resource block group and the number of subcarriers within the second resource block group. Since controlling the maximum transport power of the first user equipment for the entire frequency band, while considering an uplink signal transmission performed by the second user equipment, may be inefficient, the maximum transport power of the first user equipment is controlled only for the first resource block group, which is configured for part of the frequency band.

The method for controlling the maximum transport power of the first user equipment and the second user equipment may be divided into a case where an interference cancellation method is not used and a case where an interference cancellation method is used. Firstly, in case the interference cancellation method is not used, the maximum transport power of the first user equipment is controlled as described below. $P_{max,long} = \min(\alpha P_{max}/(N_{sRBG}/N_{RBG}), P_{max})$ Herein, $P_{max,long}$ indicates the maximum transport power of the first user equipment, $P_{max}$ indicates the maximum transport power that is used by the user equipment, $N_{RBG}$ indicates the number of subcarriers within the first resource block group, $N_{sRBG}$ indicates the number of subcarriers within the second resource block group, and $\alpha$ indicates an arbitrary coefficient. More specifically, the maximum transport power of the first user equipment is controlled so that it is smaller than the maximum transport power of the second user equipment.

In case the interference cancellation method is used, the maximum transport power of the first user equipment for the first resource block group is increased in accordance with the power increase ratio of the first user equipment. The power increase ratio of the first user equipment is configured as shown below. $\Delta_{long} = \beta/(N_{sRBG}/N_{RBG})$ Herein, $\Delta_{long}$ indicates the power increase ratio of the first user equipment, $N_{RBG}$ indicates the number of subcarriers within the first resource block group, $N_{sRBG}$ indicates the number of subcarriers within the second resource block group, and the $\beta$ indicates a power increase ratio corresponding to a case where the values of $N_{RBG}$ and $N_{sRBG}$ are equal to one another. Herein, since the interference cancellation method is used, the uplink signal of the second user equipment is decoded after the uplink signal of the first user equipment is decoded and removed.

Additionally, in case the interference cancellation method is used, the maximum transport power of the second user equipment for the first resource block group is controlled in accordance with a ratio between the number of subcarriers within the first resource block group and the number of subcarriers within the second resource block group as described below.

$$P_{max,short} = \min(\gamma P_{max}(N_{sRBG}/N_{RBG}), P_{max})$$

Herein, $P_{max,short}$ indicates the maximum transport power of the second user equipment, $P_{max}$ indicates the maximum transport power that is used by the user equipment, $N_{RBG}$ indicates the number of subcarriers within the first resource block group, $N_{sRBG}$ indicates the number of subcarriers within the second resource block group, and $\gamma$ indicates an arbitrary coefficient.

At this point, for the remaining area excluding the partial frequency band, among the entire frequency band, the maximum transport power of the first user equipment is controlled by a Transport Power Command (TPC) from the base station.

The first resource block group is designated through a higher layer signaling.

An uplink signal of the first user equipment and an uplink signal of the second user equipment are simultaneously received through the first resource block group. More specifically, the first resource block group corresponds to a radio resource that can receive the signal of the second user equipment, even if the uplink signal of the first user equipment is currently being received, since the uplink signal of the second user equipment can override the uplink signal of the first user equipment so as to be received. More specifically, the first resource block group may be configured as the same radio resource as the second resource block group. Herein, the uplink signal of the second user equipment may be decoded before the uplink signal of the first user equipment is decoded.

The uplink signal of the first user equipment is scheduled by a downlink control channel within the downlink subframe, and the uplink signal of the second user equipment is not scheduled by a downlink control channel within the downlink subframe. Herein, the downlink control channel may correspond to a PDCCH. More specifically, it is assumed that the presence or absence of an uplink signal of the second user equipment at the time point of scheduling an uplink signal of the first user equipment is unknown.

Furthermore, this specification proposes a wireless device for controlling power by using a radio frame including a downlink subframe and an uplink subframe in a wireless communication system.

The wireless device includes a radio frequency (RF) unit transmitting and receiving radio signals, and a processor being operatively connected to the RF unit. The processor configures a first resource block group for a first user equipment and a second resource block group for a second user equipment. Herein, the first resource block group is configured for part of a frequency band among an entire frequency band. The processor controls a maximum transport power of the first user equipment for the first resource block group in accordance with a ratio between a number of subcarriers within the first resource block group and a number of subcarriers within the second resource block group. Since controlling the maximum transport power of the first user equipment for the entire frequency band, while considering an uplink signal transmission performed by the second user equipment, may be inefficient, the maximum transport power of the first user equipment is controlled only for the first resource block group, which is configured for part of the frequency band. The processor receives an uplink signal of the first user equipment and an uplink signal of the second user equipment. More specifically, the first resource block group may be configured of the same radio resource as the second resource block group.

Effects of the Invention

When using the proposed method, in case a TDD communication system has both TTI and sTTI, even if a user equipment transmitting an uplink signal by using the TTI already exists, an uplink signal transmission using the sTTI may also be performed at the same time. Also, even in a situation where an uplink signal using the TTI is being received, the base station may also receive an uplink signal using the sTTI and may decode the received signal.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
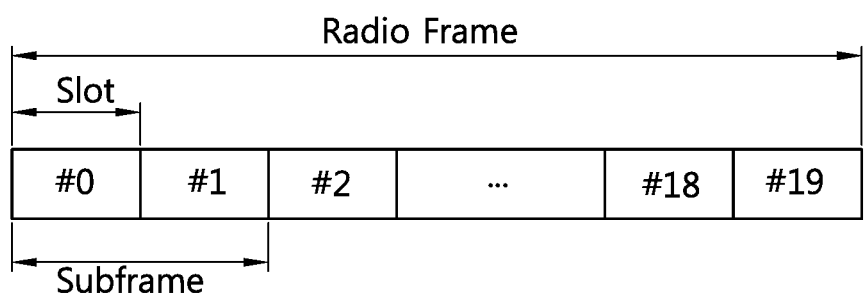
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
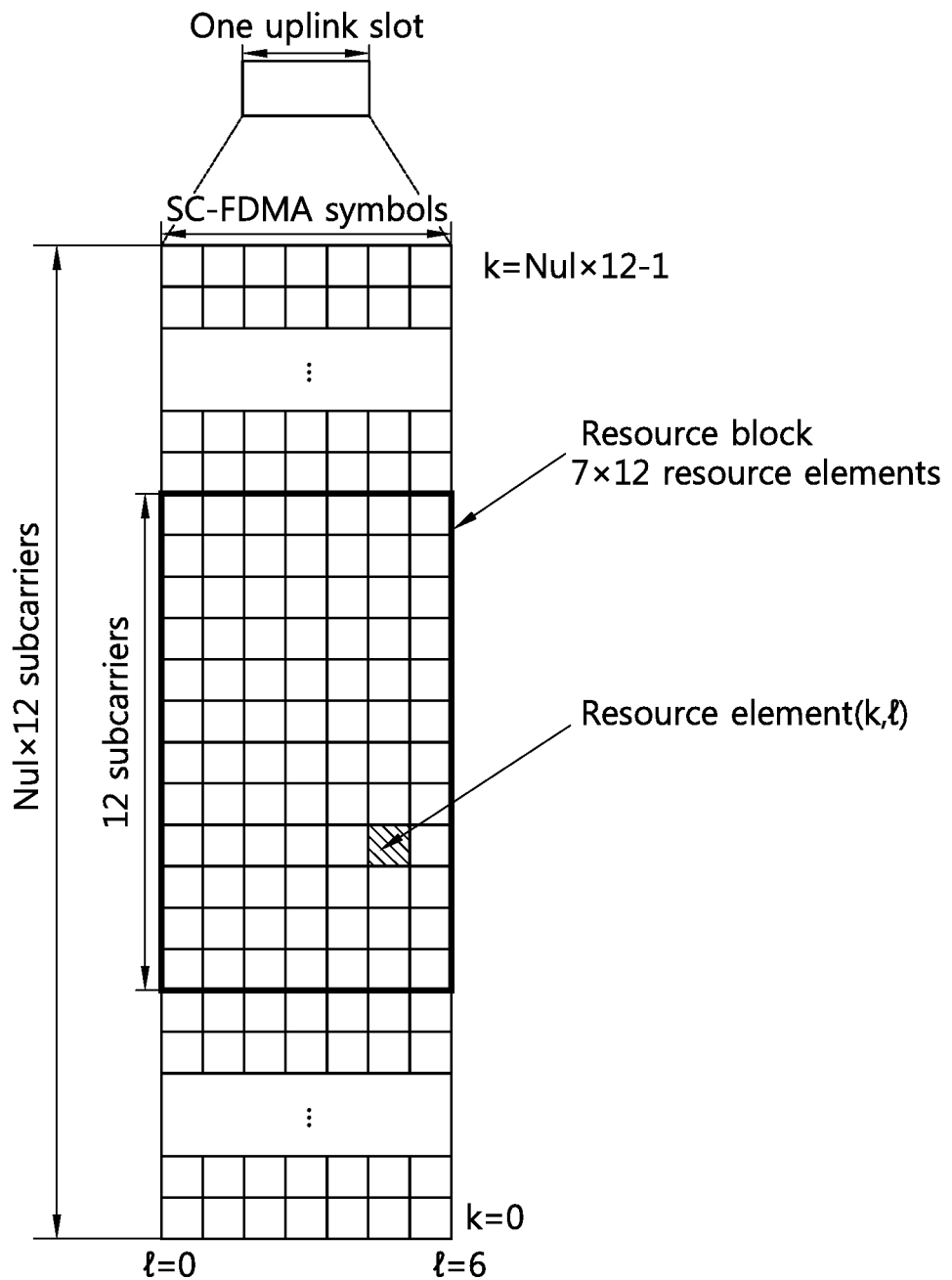
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k (k=0, . . . , $N^{UL}$×12−1) denotes a subcarrier index in the frequency domain, and l (l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
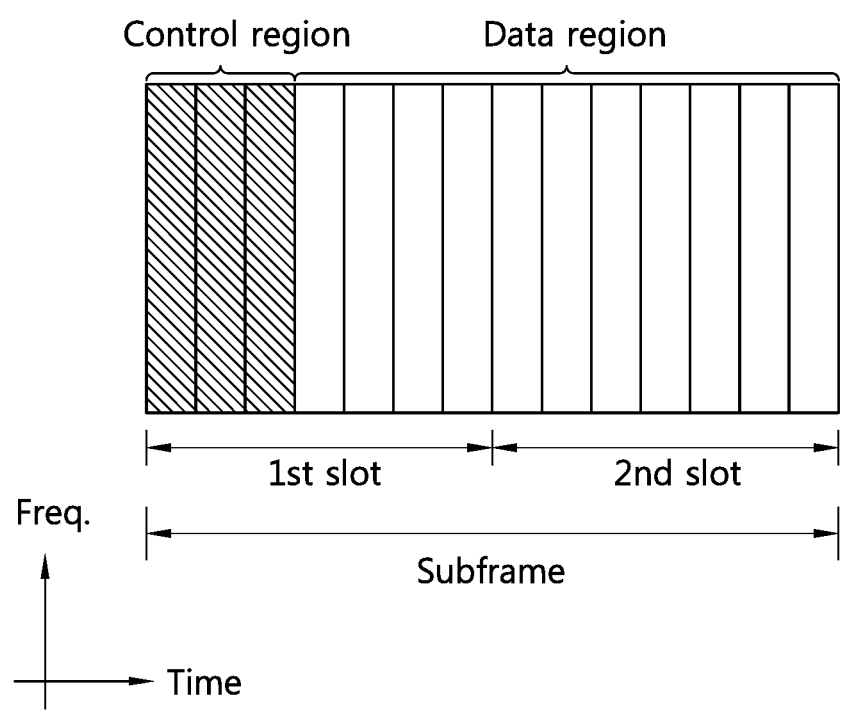
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
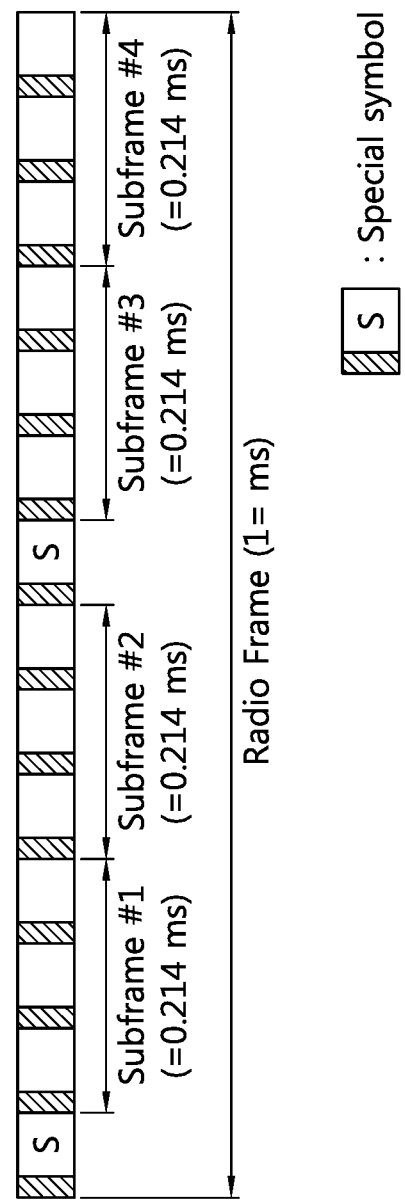
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
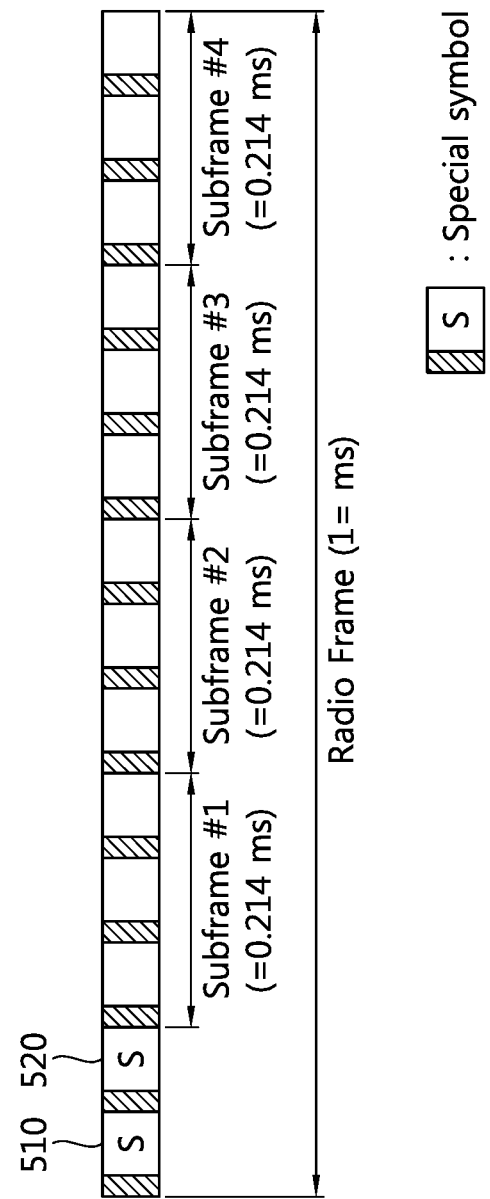
FIG. 5 shows an example of the structure of a radio frame in which special symbols have been contiguously disposed at the front part of the radio frame.
Figure 6:
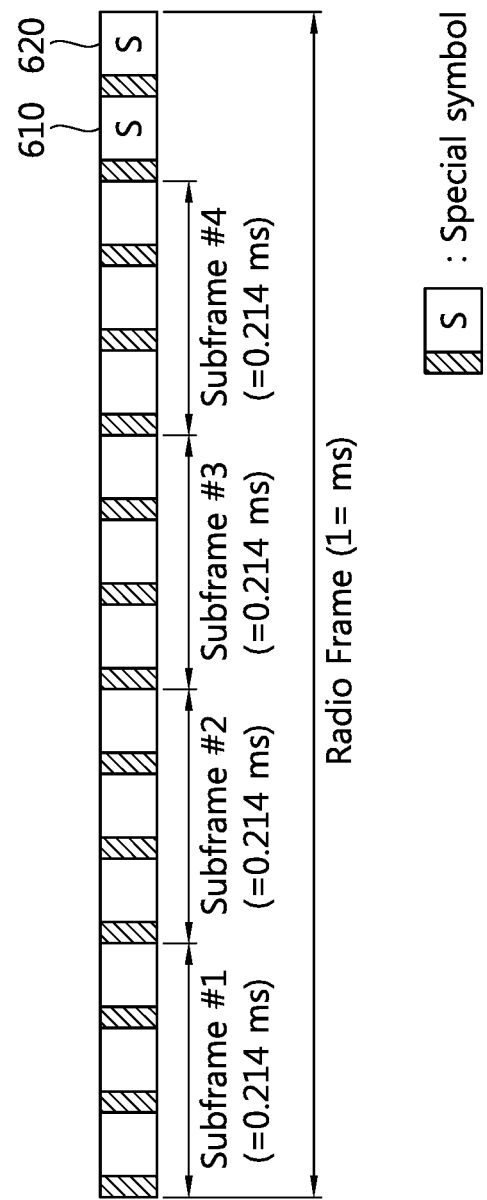
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

Figure 7:
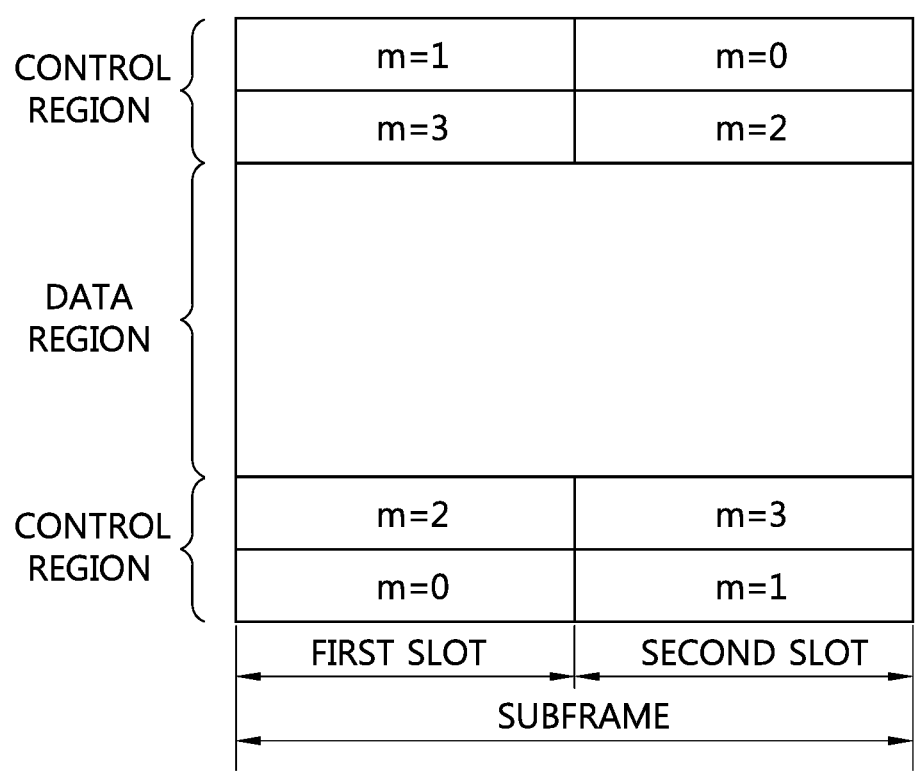
FIG. 7 shows the structure of an uplink frame.

FIG. 7 shows the structure of an uplink frame.

An uplink subframe may be divided into a control region and a data region in the frequency domain. A Physical Uplink Control Channel (PUCCH) for transmitting uplink control information (UCI) is allocated to the control region. And, a Physical Uplink Shared Channel (PUSCH) for transmitting uplink data is allocated to the data control. In this meaning, the control region may be referred to as a PUCCH region, and the data region may be referred to as a PUSCH region. According to the configuration information indicated by a higher layer, the user equipment may support simultaneous transmission of the PUSCH and the PUCCH, or the user equipment may not support simultaneous transmission of the PUSCH and the PUCCH.

The PUSCH is mapped to an Uplink Shared Channel (UL-SCH), which corresponds to a transport channel. The uplink data that is transmitted over the PUSCH may correspond to a transport block, which corresponds to a data block for the UL-SCH being transmitted during a TTI. The transport block may correspond to user information. Alternatively, the uplink data may correspond multiplexed data. The multiplexed data may consist of a multiplexing of the transport block for the UL-SCH and the uplink control information. For example, the uplink control information being multiplexed to the uplink data may include channel status information (CSI), such as a channel quality indicator (CQI), a precoding matrix indicator (PMI), a rank indicator (RI), a precoder type indication (PTI), and so on, and a hybrid automatic repeat request (HARQ) acknowledgement/not-acknowledgement (ACK/NACK), and so on (although the CQI/PMI, RI/PTI, and so on, are given as the examples of the CSI, the present invention will not be limited only to this. More specifically, the CSI includes information required by the base station for performing downlink scheduling). As described above, the transmission of the uplink control information itself or along with the uplink data from the data region is referred to as a piggy-back transmission of the UCI. Only the uplink control information may be transmitted from the PUSCH.

The PUCCH corresponding to one user equipment is allocated in the subframe in resource block (RB) pairs. The resource blocks belonging to the resource block pairs respectively occupy different subcarriers in each of a first slot and a second slot. The frequency that is occupied by the resource blocks belonging to the resource block pairs is varied (or changed) based on a slot boundary. This may be said that the RB pairs that are allocated to the PUCCH are frequency-hopped at the slot boundary. By having the user equipment transmit uplink control information through different subcarriers, frequency diversity gain may be acquired.

The PUCCH carries diverse types of control information in accordance with the format. PUCCH format 1 carries a Scheduling Request (SR). At this point, an On-Off Keying (OOK) method may be applied. PUCCH format 1a carries an Acknowledgement/Non-Acknowledgement (ACK/NACK) being modulated by using a Bit Phase Shift Keying (BPSK) method for one codeword. PUCCH format 1b carries an ACK/NACK being modulated by using a Quadrature Phase Shift Keying (QPSK) method for two codewords. PUCCH format 2 carries a Channel Quality Indicator (CQI) being modulated by using the QPSK method. PUCCH formats 2a and 2b carry a CQI and an ACK/NACK. PUCCH format 3 is modulated by using the QPSK method and may carry a plurality of ACK/NACKs and SRs.

Uplink power control determines an average transport power of a SC-FDMA symbol being transmitted through a physical channel. The uplink power control may control the transport power of diverse types of uplink channels.

Figure 8:
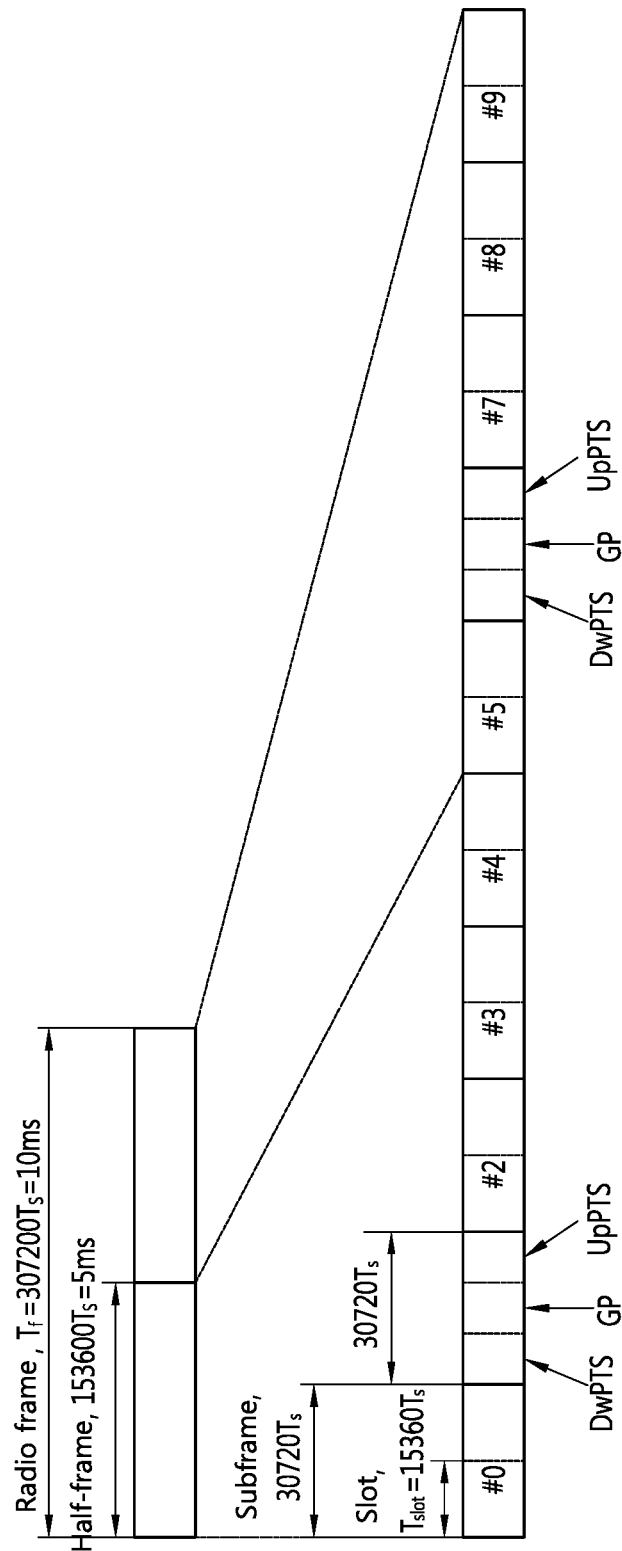
FIG. 8 shows the structure of a TDD radio frame in a 3GPP LTE system.

FIG. 8 shows the structure of a TDD radio frame in a 3GPP LTE system. For more detail, reference may be made to section 4.2 of 3GPP TS 36.211 V8.2.0 (2008 March) "Technical Specification Group Radio Access Network; Evolved Universal Terrestrial Radio Access (E-UTRA); Physical Channels and Modulation (Release 8)". One radio frame has a length of 10 ms and is configured of two half-frames each having the length of 5 ms. Also, one half-frame is configured of 5 subframes each having the length of 1 ms. Herein, one subframe is divided into 2 slots. One subframe is designated as any one of an uplink subframe (UL subframe), a downlink subframe (DL subframe), and a special subframe. One radio frame includes at least one uplink subframe and at least one downlink subframe.

One slot includes a plurality of Orthogonal Frequency Division Multiplexing (OFDM) symbols in a time domain and a plurality of subcarriers in a frequency domain. An OFDM symbol is used to express one symbol period, since the 3GPP LTE uses OFDMA in a downlink. And, therefore, the OFDM symbol may also be referred to as a different term in accordance with the multiplexing access method. For example, in case SC-FDMA is used as an uplink multiplexing access method, the OFDM symbol may be referred to as a SC-FDMA symbol. A resource block (RB) includes a plurality of consecutive (or contiguous) subcarriers within one slot in resource allocation units. However, the structure of the radio frame is merely exemplary. And, therefore, the number of subframes included in a radio frame, the number of slot included in a subframe, or the number of OFDM symbols included in a slot may be diversely varied.

It is defined in 3GPP LTE that one slot includes 7 OFDM symbols in a normal cyclic prefix (CP) and that one slot includes 6 OFDM symbols in an extended CP.

A special subframe is a special period that separates the uplink frame the downlink between an uplink subframe and a downlink subframe. At least one special frame exists in a radio frame, and a special frame includes a Downlink Pilot Time Slot (DwPTS), a Guard Period (GP), and an Uplink Pilot Time Slot (UpPTS). The DwPTS is used for initial cell search, synchronization, or channel estimation. The UpPTS is used for channel estimation by the base station and for establishing uplink transmission (or transport) synchronization of a user equipment. The GP is a guard period for eliminating (or removing) interference that may occur in an uplink due to a multi-path delay (or latency) of a downlink signal between an uplink and a downlink.

Table 1 indicates the structure of a radio frame that can be configured in accordance with the uplink subframe and downlink subframe alignment in a 3GPP LTE TDD system.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' indicates a downlink subframe, 'U' indicates an uplink subframe, and 'S' indicates a special subframe. The special subframe indicates a switching point, i.e., DwPTS+GP+UpPTS. Configurations 0~2 and 6 represent configurations wherein the downlink and the uplink changes at a switching point period (or downlink-to-uplink switch-point periodicity) of 5 ms. At this point, the special subframe exists in both of the 2 half-frames. Configurations 3~5 represent configurations wherein the downlink and the uplink changes at a switching point period of 10 ms. At this point, the special subframe exists only in a first half-frame ($1^{st}$ half-frame) among the 2 half-frames. Subframes 0 and 5 and the DwPTS of the special subframe are always allocated for the downlink transmission. And, the UpPTS of the special subframe and the subframe immediately following the special subframe are always allocated for the uplink transmission.

Table 2 shows a method for configuring the DwPTS, the GP, and the UpPTS, which are considered in a 3GPP LTE system. $T_s$ represents a sampling time and may be calculated as $1/(15000*2048)$ (sec).

9 different special subframe configurations are available in case of a normal CP, and 6 different special subframe configurations are available in case of an extended CP.

As described above, in a TDD communication system, a specific subframe may be shifted (or changed) to a downlink subframe or an uplink subframe in accordance with time. In case of shifting from an uplink subframe to a downlink subframe, a guard period for the subframe shifting is not required. However, in case of shifting from a downlink subframe to an uplink subframe, a guard period is required. This is because, when performing uplink transmission, each user equipment performs Timing Advance (TA) in order to establish uplink synchronization. Therefore, if a guard period does not exist, the period during which the user equipment receives a downlink signal may overlap with the period during which the user equipment receives an uplink signal.

Since a signal cannot be transmitted or received during the guard period, if an uplink subframe is frequently positioned in succession (or after) a downlink subframe, an overhead of the guard period increases. Therefore, in order to reduce the overhead of the guard period, the application of a method of contiguously (or consecutively) aligning downlink subframes and then contiguously (or consecutively) aligning uplink subframe afterwards is required. For example, in an LTE system, one guard period or two guard periods are positioned among 10 subframes, and downlink subframes or uplink subframes are contiguously aligned between the guard periods.

In a cellular communication system, wherein the base station manages scheduling, in case uplink subframes are contiguously aligned, the scheduling of the uplink subframes is performed by a downlink subframe, which is positioned before the uplink subframes. Accordingly, traffic occurring during the corresponding uplink subframe period cannot not be transmitted. And, therefore, the traffic should be transmitted from a next uplink subframe period after passing the downlink subframe period. At this point, there may occur a case when a specific traffic is intended to be transmitted from the uplink subframe section in which the corresponding traffic has occurred instead of waiting until the next subframe period. In this case, since a downlink subframe that can re-schedule other user equipment, which were scheduled earlier, does not exist, a collision may occur with the currently existing user equipment. For example, a system wherein a user equipment using TTI and a user equipment using a short TTI (sTTI), which is relatively shorter in time-length than the TTI, co-exist will be assumed. In this case, when a user equipment using sTTI

TABLE 2

| | Normal CP in DL | | | Extended CP in DL | | |
|---|---|---|---|---|---|---|
| | | UpPTS | | | UpPTS | |
| Special subframe configuration | DwPTS | Normal CP in UL | Extended CP in UL | DwPTS | Normal CP in UL | Extended CP in UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — | intends to transmit its urgent traffic from an uplink subframe, in which the user equipment using TTI is scheduled, signal collision between the two user equipments becomes inevitable.

Even in a case when signals of multiple user equipments are transmitted from the same subframe, if the transport power of a specific user equipment is sufficiently greater than other user equipments, or if the Modulation Coding System (MCS) level of the specific user equipment is lower, the signal of the specific user equipment cannot be decoded. Therefore, this specification proposes a method of controlling power for decoding a signal of the user equipment, which uses sTTI, in case a collision occurs between a user equipment using TTI and a user equipment using sTTI.

This specification proposes a method for controlling power allowing the base station to successfully receive a signal of the user equipment adopting sTTI, when a user equipment transmitting a signal by using sTTI intends to transmit a signal through an uplink in a situation where a user equipment transmitting a signal by using TTI is currently transmitting a signal through the same uplink. If the base station is aware of the presence of a signal of a user equipment adopting sTTI at a time point when the user equipment adopting TTI intends to transmits the signal, the base station may perform scheduling so that the two signals are not transmitted from the same resource. Therefore, in this specification, it is assumed that the base station is not aware of the presence of traffic of a user equipment adopting sTTI at the time point of scheduling the signal of the user equipment adopting TTI.

The method proposed in this specification may be divided into a case where the base station receives an uplink signal without using an interference cancellation method and a case where the base station receives an uplink signal while using an interference cancellation method. Also, each method may be further divided into a method of controlling power of a user equipment adopting TTI and a method of controlling power of a user equipment adopting sTTI.

Firstly, a method of controlling power in a case where the interference cancellation method is not used will be described in detail.

In case of decoding a signal of a user equipment adopting sTTI without using the interference cancellation method, the signal of the user equipment adopting TTI may be considered as noise or may be reduced by using an interference suppression method. In both cases, as the size of the signal of the user equipment adopting sTTI becomes larger than the size of the signal of the user equipment adopting TTI, the signal of the user equipment adopting sTTI may be decoded with more stability. Generally, since the maximum transport power of a user equipment is predetermined, the relative size of the signal adopting sTTI is required to be maintained by limiting the maximum transport power of the user equipment adopting TTI.

Hereinafter, a method of controlling the power of a user equipment adopting TTI in a case where the interference cancellation method is not used will be described in detail.

A minimum resource allocation unit of a user equipment adopting TTI may be referred to as a Resource Block Group (RBG), and a minimum resource allocation unit of a user equipment adopting sTTI may be referred to as a short RBG (sRBG). A RGB includes at least on RB, and an sRGB includes at least one sRB. The maximum transport power of the user equipment adopting TTI may be limited as described below.

The maximum transport power $P_{max,long}$ of the user equipment adopting TTI is limited while considering a ratio between the number $N_{RBG}$ of subcarriers within a RGB and the number $N_{sRBG}$ of subcarriers within an sRGB. Generally, as the number of subcarriers being allocated to an arbitrary user equipment becomes larger, the size of the power that may be used by the arbitrary user equipment on a single subcarrier decreases. Therefore, in case user equipments having different TTI lengths have different sizes of scheduling resource units, the maximum transport power of the user equipment adopting TTI should be limited. $P_{max,long}$ may be limited by using the equation shown below.

Equation 1

$$P_{max,long} = \min(\alpha P_{max}/(N_{sRBG}/N_{RBG}), P_{max}) \qquad \text{[Equation 1]}$$

Herein, $P_{max}$ indicates the maximum transport power that can be used by a user equipment, and $\alpha$ indicates an arbitrary coefficient. In an OFDM system, since the sTTI has a smaller number of transmission (or transport) OFDM symbols than the TTI, it may be generally assumed that the sRGB has a larger number of subcarriers than the RGB. Therefore, the equation for $P_{max,long}$ may be simplified as shown below.

Equation 2

$$P_{max,long} = \alpha P_{max}/(N_{sRBG}/N_{RBG}). \qquad \text{[Equation 2]}$$

Additionally, if the user equipment adopting sTTI transmits a signal by using a competition resource, the maximum transport power $P_{max,long}$ of the user equipment may be limited as shown below, while considering a ratio between the number $N_{sRBG,compet}$ of subcarriers within a competition resource being allocated to a single user equipment and $N_{RBG}$.

Equation 3

$$P_{max,long} = \alpha P_{max}/(N_{sRBG,compet}/N_{RBG}) \qquad \text{[Equation 3]}$$

Limiting the transport power of the user equipment adopting TTI in all RBs, while considering the signal transmission performed by the user equipment adopting sTTI, may be inefficient. Therefore, this may be applied only to a specific RB. More specifically, in case of a specific RB limiting the maximum transport power while considering the transmission performed by the user equipment adopting sTTI, even if the user equipment adopting TTI is currently transmitting a signal, the specific RB corresponds to an RB, wherein the user equipment adopting sTTI can override the transmission of the user equipment adopting TTI and transmit its signal. The position of the corresponding RB may be designated by L1/L2/L3 signaling. In other words, the specific RB has part of the frequency band among the entire frequency band. Since the RGB may also have part of the frequency band among the entire frequency band, the specific RB may also correspond to a specific RGB. The remaining area excluding the partial frequency band may be controlled by Transport Power Conmand (TPC) just as in the conventional method.

In case the above-described interference cancellation method is not used, a detailed exemplary embodiment of the method for controlling the power of the user equipment adopting TTI is as described below.

The terms used herein will first be defined. A first user equipment may refer to the user equipment adopting TTI, and a second user equipment may refer to the user equipment adopting sTTI. A first resource block group may correspond to a RBG, which is the minimum resource allocation unit of the user equipment adopting TTI, and a second resource block group may correspond to an sRGB, which is the minimum resource allocation unit of the user equipment adopting sTTI. More specifically, the first resource block group is transmitted in TTI units corresponding to a subframe, and the second resource block group is transmitted in sTTI units, which are configured to be shorter than TTI in time. Since the system corresponds to a TDD based wireless communication system, communication is performed by using a radio frame, which includes a downlink subframe and an uplink subframe that follows the downlink subframe.

A first resource block group for the first user equipment and a second resource block group for the second user equipment are configured. Herein, the first resource block group is configured in part of the frequency band among the entire frequency band.

The maximum transport power of the first user equipment for the first resource block group is controlled in accordance with a ratio between the number of subcarriers within the first resource block group and the number of subcarriers within the second resource block group. The maximum transport power of the first user equipment is controlled as described below. $P_{max,long} = \min(\alpha P_{max}/(N_{sRBG}/N_{RBG}), P_{max})$ Herein, $P_{max,long}$ indicates the maximum transport power of the first user equipment, $P_{max}$ indicates the maximum transport power that is used by the user equipment, $N_{RBG}$ indicates the number of subcarriers within the first resource block group, $N_{sRBG}$ indicates the number of subcarriers within the second resource block group, and $\alpha$ indicates an arbitrary coefficient. More specifically, the maximum transport power of the first user equipment is controlled so that it is smaller than the maximum transport power of the second user equipment. Since controlling the maximum transport power of the first user equipment for the entire frequency band, while considering an uplink signal transmission performed by the second user equipment, may be inefficient, the maximum transport power of the first user equipment is controlled only for the first resource block group, which is configured for part of the frequency band.

At this point, for the remaining area excluding the partial frequency band, among the entire frequency band, the maximum transport power of the first user equipment is controlled by a Transport Power Command (TPC) from the base station.

An uplink signal of the first user equipment and an uplink signal of the second user equipment are simultaneously received through the first resource block group. More specifically, the first resource block group corresponds to a radio resource that can receive the signal of the second user equipment, even if the uplink signal of the first user equipment is currently being received, since the uplink signal of the second user equipment can override the uplink signal of the first user equipment so as to be received. More specifically, the first resource block group may be configured of the same radio resource as the second resource block group. Herein, the uplink signal of the second user equipment may be decoded before the uplink signal of the first user equipment is decoded.

Hereinafter, in case the interference cancellation method is not used, the method for controlling the power of the user equipment adopting sTTI will be described in detail.

A method for configuring the transport power of the user equipment adopting sTTI may be divided into a case when the user equipment adopting sTTI transmits a signal after receiving a UL grant and a case when the user equipment adopting sTTI transmits a signal without receiving a UL grant or before receiving a UL grant.

In case the user equipment adopting sTTI transmits a signal after receiving a UL grant, the transport power of the user equipment adopting sTTI may be determined as described below.

In a radio frame wherein the sTTI and the TTI co-exist, even if power control information of the same UL grant is received from the base station, the user equipment changes the power that is actually applied in accordance with a TDD configuration and the subframe. The user equipment adopting sTTI may identify the format of the subframe in accordance with the information on the TDD configuration and an index of the subframe, which the corresponding user equipment is transmitting. Accordingly, if it is determined that the signal corresponds to a signal that is originally being transmitted from the subframe adopting sTTI, the power control value assigned to the corresponding signal is used.

Conversely, if it is determined that the signal corresponds to a signal that is transmitted from a subframe adopting TTI, the power control value assigned to the corresponding signal is used. More specifically, even if a Transport Power Command (TPC) is received from the base station, the user equipment adopting sTTI is capable of controlling power on its own.

For example, a mapping table adopting the power control information of the UL grant may be varied in accordance with the TDD configuration and the subframe index. As another example, all values of the mapping table adopting the power control information of the UL grant may be increased to A times the initial values in accordance with the TDD configuration and the subframe index. Additionally, the table adopting the power control information of the UL grant may be varied in accordance with whether or not the sTTI is being applied, whether or not transmission is being performed via downlink, or whether or not the network corresponds to a Multicast Broadcast Single Frequency Network (MBSFN).

Moreover, the user equipment adopting sTTI may vary the value of the transport power depending upon whether or not the subframe corresponds to a subframe adopting MBSFN.

In case the user equipment adopting sTTI transmits a signal without receiving a UL grant, the signal may be transmitted at the maximum transport power or by using a value that is designated by a higher layer signaling.

Hereinafter, a method for controlling power in a case where the interference cancellation method is used will be described.

If data having the same size are transmitted through both the sTTI and the TTI, a case where the signal is transmitted by using sTTI may use a larger number of subcarriers as compared to a case where the signal is transmitted by using TTI. Therefore, it can be understood that a case where the number of subcarriers within an sRGB is larger than the number of subcarriers within a RGB may occur more frequently. In this case, an excessive amount of transport power restriction is applied to the user equipment adopting TTI, which may lead to a problem of performance degradation.

Herein, the fact that the size of power that can be used per single subcarrier is larger in the case where the TTI is adopted than in the case where the sTTI is adopted. Accordingly, a method of first decoding and removing the signal transmitted from the base station by using TTI and then decoding the signal using the sTTI is considered. Since it is difficult to wait for all of the signals being received by using the TTI in order to decode the signal being transmitted by using the sTTI, it will be assumed that the signals using TTI are decoded only by symbol levels. In the case of using the interference cancellation method, in order to allow the signals using the TTI to be decoded with stability, it is required to increase the power of the signals using the TTI or to set-up (or configure) a maximum transport power value of the signal using the sTTI.

Hereinafter, a method for controlling power of the user equipment adopting TTI in a case where the interference cancellation method is used will be described.

A minimum value of increase of the user equipment adopting TTI may be designated by L2/L3 signaling. Alternatively, the power may be limited by using a RGB corresponding to a minimum resource allocation unit of the user equipment adopting TTI and an sRGB corresponding to a minimum resource allocation unit of the user equipment adopting sTTI.

An increase ratio $\Delta_{long}$ of the transport power of the user equipment adopting TTI is configured while considering a ratio between the number $N_{RBG}$ of subcarriers within a RGB and the number $N_{sRBG}$ of subcarriers within an sRGB. $\Delta_{long}$ may be configured as described below.

Equation 4

$$\Delta_{long} = \beta / (N_{sRBG}/N_{RBG}) \quad [\text{Equation 4}]$$

Herein, $\beta$ indicates an increase ratio of the transport power corresponding to a case where the number of subcarriers of the scheduling unit used by the user equipment adopting sTTI and the number of subcarriers of the scheduling unit used by the user equipment adopting TTI are equal to one another. More specifically, $\beta$ indicates an increase ratio of the transport power corresponding to a case where the values of $N_{RBG}$ and $N_{sRBG}$ are equal to one another.

If the user equipment adopting sTTI transmits a signal by using a competition resource, the increase ratio $\Delta_{long}$ of the transport power of the user equipment adopting TTI may be limited as shown below by using a ratio between the number $N_{sRBG,compet}$ of subcarriers within a competition resource being allocated to a single user equipment and $N_{RBG}$.

Equation 5

$$\Delta_{long} = \beta / (N_{sRBG,compet}/N_{RBG}) \quad [\text{Equation 5}]$$

Limiting the transport power of the user equipment adopting TTI in all RBs, while considering the signal transmission performed by the user equipment adopting sTTI, may be inefficient. Therefore, this may be applied only to a specific RB. More specifically, in case of a specific RB limiting the maximum transport power while considering the transmission performed by the user equipment adopting sTTI, even if the user equipment adopting TTI is currently transmitting a signal, the specific RB corresponds to an RB, wherein the user equipment adopting sTTI can override the transmission of the user equipment adopting TTI and transmit its signal. The position of the corresponding RB may be designated by L1/L2/L3 signaling. In other words, the specific RB has part of the frequency band among the entire frequency band. Since the RGB may also have part of the frequency band among the entire frequency band, the specific RB may also correspond to a specific RGB. The remaining area excluding the partial frequency band may be controlled by Transport Power Comand (TPC) just as in the conventional method.

In case the above-described interference cancellation method is used, a detailed exemplary embodiment of the method for controlling the power of the user equipment adopting TTI is as described below.

The terms used herein will first be defined. A first user equipment may refer to the user equipment adopting TTI, and a second user equipment may refer to the user equipment adopting sTTI. A first resource block group may correspond to a RBG, which is the minimum resource allocation unit of the user equipment adopting TTI, and a second resource block group may correspond to an sRGB, which is the minimum resource allocation unit of the user equipment adopting sTTI. More specifically, the first resource block group is transmitted in TTI units corresponding to a subframe, and the second resource block group is transmitted in sTTI units, which are configured to be shorter than TTI in time. Since the system corresponds to a TDD based wireless communication system, communication is performed by using a radio frame, which includes a downlink subframe and an uplink subframe that follows the downlink subframe.

A first resource block group for the first user equipment and a second resource block group for the second user equipment are configured. Herein, the first resource block group is configured in part of the frequency band among the entire frequency band.

The maximum transport power of the first user equipment for the first resource block group is increased in accordance with the power increase ratio of the first user equipment. The power increase ratio of the first user equipment is configured as shown below. $\Delta_{long} = \beta / (N_{sRBG}/N_{RBG})$ Herein, $\Delta_{long}$ indicates the power increase ratio of the first user equipment, $N_{RBG}$ indicates the number of subcarriers within the first resource block group, $N_{sRBG}$ indicates the number of subcarriers within the second resource block group, and the $\beta$ indicates a power increase ratio corresponding to a case where the values of $N_{RBG}$ and $N_{sRBG}$ are equal to one another. Since controlling the maximum transport power of the first user equipment for the entire frequency band, while considering an uplink signal transmission performed by the second user equipment, may be inefficient, the maximum transport power of the first user equipment is controlled only for the first resource block group, which is configured for part of the frequency band.

At this point, for the remaining area excluding the partial frequency band, among the entire frequency band, the maximum transport power of the first user equipment is controlled by a Transport Power Command (TPC) from the base station.

An uplink signal of the first user equipment and an uplink signal of the second user equipment are simultaneously received through the first resource block group. More specifically, the first resource block group corresponds to a radio resource that can receive the signal of the second user equipment, even if the uplink signal of the first user equipment is currently being received, since the uplink signal of the second user equipment can override the uplink signal of the first user equipment so as to be received. More specifically, the first resource block group may be configured of the same radio resource as the second resource block group. Since the interference cancellation method is used, the uplink signal of the second user equipment is decoded after the uplink signal of the first user equipment is decoded and removed.

Hereinafter, in case the interference cancellation method is used, the method for controlling the power of the user equipment adopting sTTI will be described in detail.

In order to decode the signal of the user equipment adopting TTI with stability, the transport power of the user equipment adopting the short TTI is required to be limited (or restricted). Even if the maximum transport power of the user equipment adopting sTTI is limited, if the signal of the user equipment adopting TTI is decoded and removed, a reception Signal Noise Ratio (SNR) of the user equipment may be more enhanced. A minimum resource allocation unit of a user equipment adopting TTI may be referred to as a Resource Block Group (RBG), and a minimum resource allocation unit of a user equipment adopting sTTI may be referred to as a short RBG (sRBG). A RGB includes at least on RB, and an sRGB includes at least one sRB. The maximum transport power of the user equipment adopting sTTI may be limited as described below by using a RGB corresponding to a minimum resource allocation unit of a user equipment adopting TTI and an sRGB corresponding to a minimum resource allocation unit of a user equipment adopting sTTI.

The maximum transport power $P_{max,short}$ of the user equipment adopting sTTI may be limited as shown below, while considering a ratio between the number $N_{RBG}$ of subcarriers within a RGB and the number $N_{sRBG}$ of subcarriers within an sRGB.

Equation 6

$$P_{max,short}=\min(\gamma P_{max}(N_{sRBG}/N_{RBG}), P_{max}) \quad \text{[Equation 6]}$$

Herein, $P_{max}$ indicates the maximum transport power that can be used by a user equipment, and γ indicates an arbitrary coefficient.

In case the user equipment adopting sTTI transmits a signal by using a competition resource, the maximum transport power $P_{max,long}$ of the user equipment may be limited as shown below, while considering a ratio between the number $N_{sRBG,compet}$ of subcarriers within a competition resource being allocated to a single user equipment and $N_{RBG}$.

Equation 7

$$P_{max,long}=\min(\gamma P_{max}(N_{sRBG,compet}/N_{RBG}), P_{max}) \quad \text{[Equation 7]}$$

In case the above-described interference cancellation method is not used, a detailed exemplary embodiment of the method for controlling the power of the user equipment adopting sTTI is as described below.

The terms used herein will first be defined. A first user equipment may refer to the user equipment adopting TTI, and a second user equipment may refer to the user equipment adopting sTTI. A first resource block group may correspond to a RBG, which is the minimum resource allocation unit of the user equipment adopting TTI, and a second resource block group may correspond to an sRGB, which is the minimum resource allocation unit of the user equipment adopting sTTI. More specifically, the first resource block group is transmitted in TTI units corresponding to a subframe, and the second resource block group is transmitted in sTTI units, which are configured to be shorter than TTI in time. Since the system corresponds to a TDD based wireless communication system, communication is performed by using a radio frame, which includes a downlink subframe and an uplink subframe that follows the downlink subframe.

A first resource block group for the first user equipment and a second resource block group for the second user equipment are configured. Herein, the first resource block group is configured in part of the frequency band among the entire frequency band.

The maximum transport power of the second user equipment for the first resource block group is controlled in accordance with a ratio between the number of subcarriers within the first resource block group and the number of subcarriers within the second resource block group as described below.

$$P_{max,short}=\min(\gamma P_{max}(N_{sRBG}/N_{RBG}), P_{max})$$

Herein, $P_{max,short}$ indicates the maximum transport power of the second user equipment, $P_{max}$ indicates the maximum transport power that is used by the user equipment, $N_{RBG}$ indicates the number of subcarriers within the first resource block group, $N_{sRBG}$ indicates the number of subcarriers within the second resource block group, and γ indicates an arbitrary coefficient.

An uplink signal of the first user equipment and an uplink signal of the second user equipment are simultaneously received through the first resource block group. More specifically, the first resource block group corresponds to a radio resource that can receive the signal of the second user equipment, even if the uplink signal of the first user equipment is currently being received, since the uplink signal of the second user equipment can override the uplink signal of the first user equipment so as to be received. More specifically, the first resource block group may be configured of the same radio resource as the second resource block group.

Figure 9:
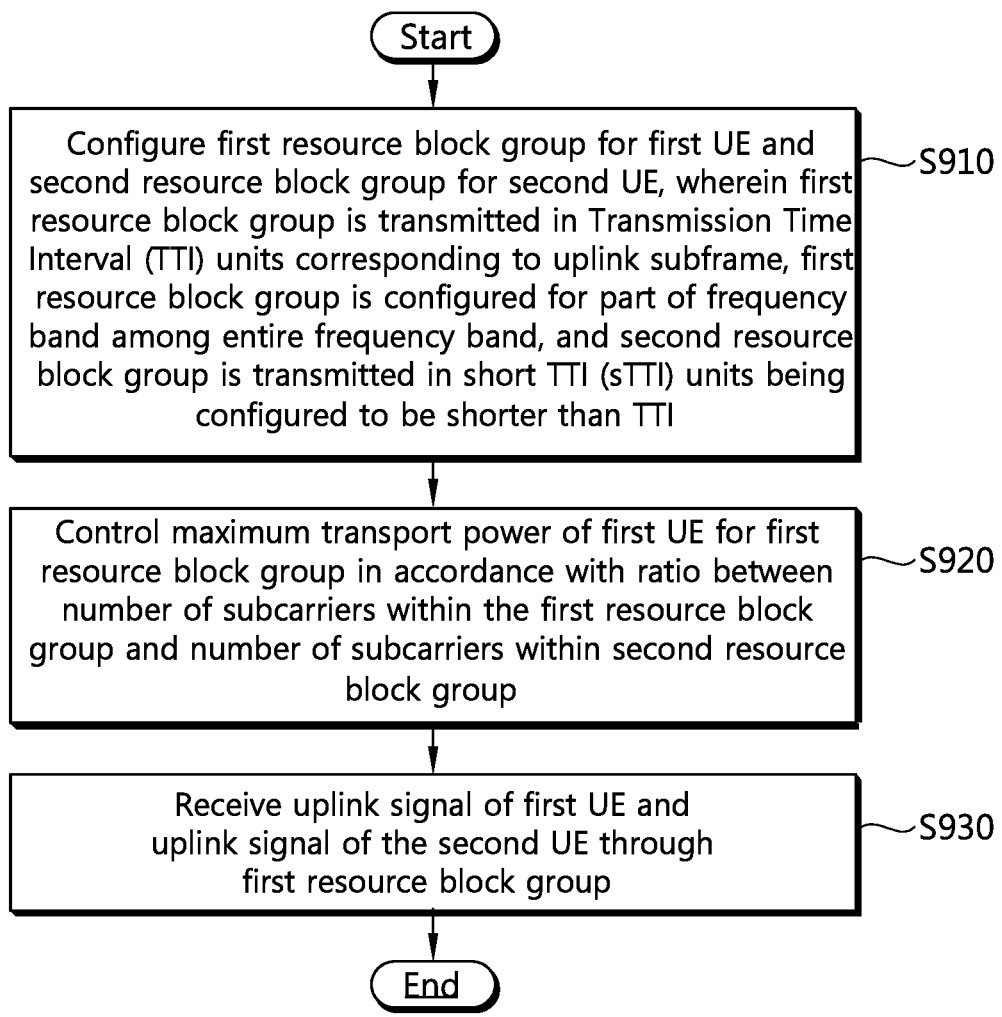
FIG. 9 is a flow chart showing a procedure for controlling power in a wireless communication system according to an exemplary embodiment of this specification.

FIG. 9 is a flow chart showing a procedure for performing communication in a wireless communication system according to an exemplary embodiment of this specification.

The terms used herein will first be defined. A first user equipment may refer to the user equipment adopting TTI, and a second user equipment may refer to the user equipment adopting sTTI. A first resource block group may correspond to a RBG, which is the minimum resource allocation unit of the user equipment adopting TTI, and a second resource block group may correspond to an sRGB, which is the minimum resource allocation unit of the user equipment adopting sTTI. More specifically, the first resource block group is transmitted in TTI units corresponding to a subframe, and the second resource block group is transmitted in sTTI units, which are configured to be shorter than TTI in time. Since the system corresponds to a TDD based wireless communication system, communication is performed by using a radio frame, which includes a downlink subframe and an uplink subframe that follows the downlink subframe.

In step S910, a first resource block group for the first user equipment and a second resource block group for the second user equipment are configured. Herein, the first resource block group is configured in part of the frequency band among the entire frequency band.

In step S920, the maximum transport power of the first user equipment for the first resource block group is controlled in accordance with a ratio between the number of subcarriers within the first resource block group and the number of subcarriers within the second resource block group. Since controlling the maximum transport power of the first user equipment for the entire frequency band, while considering an uplink signal transmission performed by the second user equipment, may be inefficient, the maximum transport power of the first user equipment is controlled only for the first resource block group, which is configured for part of the frequency band.

At this point, for the remaining area excluding the partial frequency band, among the entire frequency band, the maximum transport power of the first user equipment is controlled by a Transport Power Command (TPC) from the base station.

In step S930, an uplink signal of the first user equipment and an uplink signal of the second user equipment are simultaneously received through the first resource block group. More specifically, the first resource block group corresponds to a radio resource that can receive the signal of the second user equipment, even if the uplink signal of the first user equipment is currently being received, since the uplink signal of the second user equipment can override the uplink signal of the first user equipment so as to be received. More specifically, the first resource block group may be configured of the same radio resource as the second resource block group.

Figure 10:
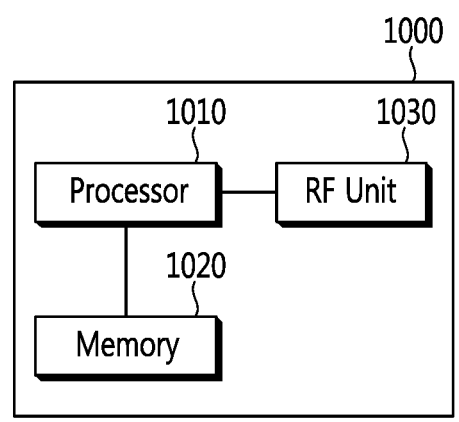
FIG. 10 is a block diagram showing an apparatus for wireless communication for implementing an embodiment of the present invention.

FIG. 10 is a block diagram showing an apparatus for wireless communication for implementing an embodiment of the present invention.

An apparatus 1000 for wireless communication includes a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for controlling power by using a radio frame including a downlink subframe and an uplink subframe in a wireless communication system, comprising:
    configuring, by a base station, a first resource block group for a first user equipment and a second resource block group for a second user equipment, wherein the first resource block group is transmitted in Transmission Time Interval (TTI) units corresponding to the uplink subframe, wherein the first resource block group is configured for part of a frequency band among an entire frequency band, and wherein the second resource block group is transmitted in short TTI (sTTI) units being configured to be shorter than the TTI;
    controlling, by the base station, a maximum transport power of the first user equipment for the first resource block group in accordance with a ratio between a number of subcarriers within the first resource block group and a number of subcarriers within the second resource block group; and
    receiving, by the base station, an uplink signal of the first user equipment and an uplink signal of the second user equipment through the first resource block group, wherein the first resource block group is configured of the same radio resource as the second resource block group.

2. The method of claim 1, wherein the maximum transport power of the first user equipment is controlled by a Transport Power Command (TPC) for a remaining frequency band excluding the part of the frequency band among the entire frequency band.

3. The method of claim 1, wherein the maximum transport power of the first user equipment is controlled as described below:

$$P_{max,long} = \min(\alpha P_{max}/(N_{sRBG}/N_{RBG}), P_{max})$$

wherein, $P_{max,long}$ indicates the maximum transport power of the first user equipment, $P_{max}$ indicates the maximum transport power that is used by the user equipment, $N_{RBG}$ indicates a number of subcarriers within the first resource block group, $N_{sRBG}$ indicates a number of subcarriers within the second resource block group, and α indicates an arbitrary coefficient.

4. The method of claim 3, wherein the maximum transport power of the first user equipment is controlled to be smaller than the maximum transport power of the second user equipment.

5. The method of claim 3, wherein the uplink signal of the first user equipment and the uplink signal of the second user equipment are simultaneously received through the first resource block group.

6. The method of claim 3, wherein the uplink signal of the second user equipment is decoded before decoding the uplink signal of the first user equipment.

7. The method of claim 1, wherein the step of controlling a maximum transport power of the first user equipment comprises:
    increasing the maximum transport power of the first user equipment in accordance with a power increase ratio of the first user equipment,
    wherein the power increase ratio of the first user equipment is configured as shown below:

$$\Delta_{long} = \beta/(N_{sRBG}/N_{RBG}), \text{ and}$$

wherein $\Delta_{long}$ indicates the power increase ratio of the first user equipment, $N_{RBG}$ indicates a number of subcarriers within the first resource block group, $N_{sRBG}$ indicates a number of subcarriers within the second resource block group, and β indicates a power increase ratio corresponding to a case where the values of $N_{RBG}$ and $N_{sRBG}$ are equal to one another.

8. The method of claim 1, further comprising:
controlling a maximum transport power of the second user equipment in accordance with a ratio between a number of subcarriers within the first resource block group and a number of subcarriers within the second resource block group,
wherein the maximum transport power of the second user equipment is controlled as shown below:

$$P_{max,short} = \min(\gamma P_{max}(N_{sRBG}/N_{RBG}), P_{max})$$

wherein $P_{max,short}$ indicates the maximum transport power of the second user equipment, $P_{max}$ indicates the maximum transport power that is used by the user equipment, $N_{RBG}$ indicates a number of subcarriers within the first resource block group, $N_{sRBG}$ indicates a number of subcarriers within the second resource block group, and γ indicates an arbitrary coefficient.

9. The method of claim 8, wherein the uplink signal of the second user equipment is decoded after the uplink signal of the first user equipment is decoded and removed.

10. The method of claim 1, wherein the first resource block group is designated through a higher layer signaling.

11. The method of claim 1, wherein the uplink signal of the first user equipment is scheduled by a downlink control channel within the downlink subframe, and wherein the uplink signal of the second user equipment is not scheduled by a downlink control channel within the downlink subframe.

12. A wireless device for controlling power by using a radio frame including a downlink subframe and an uplink subframe in a wireless communication system, comprising:
a radio frequency (RF) unit that transmits and receives radio signals; and
a processor being operatively connected to the RF unit, wherein the processor is configured to:
configure a first resource block group for a first user equipment and a second resource block group for a second user equipment, wherein the first resource block group is transmitted in Transmission Time Interval (TTI) units corresponding to the uplink subframe, wherein the first resource block group is configured for part of a frequency band among an entire frequency band, and wherein the second resource block group is transmitted in short TTI (sTTI) units being configured to be shorter than the TTI,
control a maximum transport power of the first user equipment for the first resource block group in accordance with a ratio between a number of subcarriers within the first resource block group and a number of subcarriers within the second resource block group, and
receive an uplink signal of the first user equipment and an uplink signal of the second user equipment through the first resource block group, wherein the first resource block group is configured of the same radio resource as the second resource block group.

* * * * *